United States Patent [19]

Jansch

[11] Patent Number: 5,451,084
[45] Date of Patent: Sep. 19, 1995

[54] INSERT FOR USE IN SLIPS

[75] Inventor: Manfred Jansch, Garbsen, Germany

[73] Assignee: Weatherford/Lamb, Inc., Houston, Tex.

[21] Appl. No.: 116,461

[22] Filed: Sep. 3, 1993

[30] Foreign Application Priority Data

Sep. 3, 1992 [DE] Germany .................. 42 29 345.6

[51] Int. Cl.$^6$ .................. B25B 13/58; E21B 19/07
[52] U.S. Cl. .................. 294/1.1; 175/423; 294/102.2; 294/902
[58] Field of Search .................. 294/1.1, 86.4, 86.1, 294/86.26, 86.3–86.32, 90, 91, 99.1, 102.1, 102.2, 119.3, 902; 81/57.15, 57.17, 57.18, 185.1; 175/423; 279/46.6, 151; 285/140–148; 188/67

[56] References Cited

U.S. PATENT DOCUMENTS

| | | | |
|---|---|---|---|
| D. 314,896 | 2/1991 | Haynes | D8/22 |
| D. 336,836 | 6/1993 | Neves | D8/4 |
| 1,719,533 | 7/1929 | Cady . | |
| 1,836,680 | 12/1931 | Nixon | 175/423 |
| 1,838,439 | 12/1931 | O-Brien | 175/423 |
| 2,184,231 | 12/1939 | Allen | 175/423 |
| 2,287,432 | 6/1942 | Kinzbach . | |
| 2,493,556 | 1/1950 | Stone | 175/423 X |
| 2,830,788 | 4/1958 | Bentley et al. | 254/31 |
| 2,870,794 | 1/1959 | Thaxton | 285/146 X |
| 2,896,292 | 7/1959 | Kinzbach . | |
| 2,962,919 | 12/1960 | Grundmann et al. | 81/185.1 X |
| 3,015,142 | 1/1962 | Rosanoff et al. | 294/86.4 |
| 3,023,651 | 3/1962 | Wallace | 81/57 |
| 3,122,811 | 3/1964 | Gilreath | 188/67 |
| 3,261,241 | 7/1966 | Catland | 81/57.18 |
| 3,272,038 | 9/1966 | Burstall | 81/186 |
| 3,371,562 | 3/1968 | Kelley | 81/57.18 |
| 3,513,511 | 5/1970 | Crickmer | 175/423 |
| 3,531,836 | 10/1970 | Crickmer . | |
| 3,538,561 | 11/1970 | Anastasiu et al. | 175/423 |
| 3,589,742 | 6/1971 | Flick | 279/71 |
| 3,778,094 | 12/1973 | Grolet et al. | 294/1.1 |
| 3,799,010 | 3/1974 | Guier | 81/57.17 |
| 3,875,826 | 4/1975 | Dreyfuss et al. | 81/57.18 |
| 4,060,014 | 11/1977 | Turner, Jr. | 81/57.2 |
| 4,077,250 | 3/1978 | Wesch, Jr. | 73/49.8 |
| 4,084,453 | 4/1978 | Eckel | 81/57.18 |
| 4,192,206 | 3/1980 | Schulze-Becking | 81/57.8 |
| 4,250,773 | 2/1981 | Haynes et al. | 81/57.18 |
| 4,276,771 | 7/1981 | Wesch, Jr. | 73/49.8 |
| 4,281,535 | 8/1981 | Wesch, Jr. | 73/49.8 |
| 4,297,922 | 11/1981 | Higdon | 81/57.18 |
| 4,576,067 | 3/1986 | Buck | 81/185.1 |
| 4,593,584 | 6/1986 | Neves | 81/57.18 |
| 4,649,777 | 3/1987 | Buck | 81/57.19 |
| 4,709,599 | 12/1987 | Buck | 81/57.18 |
| 4,712,284 | 12/1987 | Coyle, Sr. et al. | 29/240 |
| 4,836,064 | 6/1989 | Slator | 81/57.18 |
| 4,869,137 | 9/1989 | Slator | 81/57.18 |
| 5,044,232 | 9/1991 | Schulze-Becking | 81/57.18 |
| 5,167,173 | 12/1992 | Pietras | 81/57.15 |
| 5,221,099 | 6/1993 | Jansch | 279/151 |

FOREIGN PATENT DOCUMENTS

| | | |
|---|---|---|
| 806426 | 2/1952 | Germany .................. 175/423 |
| 1468456 | 3/1977 | United Kingdom . |
| 2085782 | 5/1982 | United Kingdom . |
| PCT/DE91/-00377 | 11/1991 | WIPO . |

OTHER PUBLICATIONS

"Petroleum Equipment Group," Joy Manufacturing Company, 1982–83 Composite Catalog, pp. 5082–5083, 1982.
"1990–91 General Services and Products Catalog," Weatherford Int'l, pp. 12,23,25,26.

Primary Examiner—Johnny D. Cherry
Attorney, Agent, or Firm—Guy McClung

[57] ABSTRACT

An insert for use in slips comprises a resilient base member in which are vulcanized a plurality of strips each having pipe gripping teeth.

34 Claims, 2 Drawing Sheets

INSERT FOR USE IN SLIPS

FIELD OF THE INVENTION

This invention relates to an insert for use in slips, an adaptor provided with a plurality of such inserts and slips provided with one or more such adaptors, The invention also relates to an elevator provided with inserts in accordance with the invention.

BACKGROUND OF THE INVENTION

Slips are used to hold casing in position while additional lengths of casing are being added to the casing string. Known slips include gripping surfaces which significantly damage the surface of the casing.

A gripping surface for use in tongs comprising a resilient base member embedded on its surface with particles of carborundum is also known. However, while this gripping surface causes minimal damage to the surface of the pipe being gripped, it is insufficient to safely retain long casing strings.

The present invention aims, at least in its preferred embodiments, to provide an insert which will adequately grip reasonably long casing strings with minimal damage to the casing.

According to the present invention there is provided an insert for use in slips, which insert comprises a resilient base member which supports a plurality of strips having a pipe gripping surface.

Preferably, said pipe gripping surface comprises teeth. However, it could also comprise particulate material bonded to said strips. Such material could comprise, for example carborundum or diamond grit.

Advantageously, said teeth have a leading face which is inclined at an angle α of from 60° to 120° to the longitudinal axis of the strip.

Preferably, α is substantially 90°.

Advantageously, said teeth have a trailing face which is inclined at an angle β of from 20° to 50° to the longitudinal axis of the strip.

Preferably, β is substantially 35°.

Advantageously, the depth of said teeth is from 0.2 mm to 2 mm.

Preferably, d is substantially 1 mm.

If desired, the teeth may be of differing hardness, for example relatively hard teeth towards the top of the insert and relatively soft teeth towards the bottom.

Advantageously, said strips, in use, extend substantially parallel with the longitudinal axis of casing to be gripped. If desired, said strip could be inclined to the longitudinal axis of the casing. In an alternative embodiment, the strips would be arranged perpendicular to the longitudinal axis of the casing to be gripped. Such an embodiment could be used where resistance to torsional forces is particularly important.

Preferably, said strips project beyond said resilient base member to accommodate debris from the surface of said casing. This arrangement is particularly useful since it allows space between the strips to accommodate paint and other debris derived from the surface of the casing. However, it would also be possible for the surface of the strips to be flush with the surface of the resilient base member.

Advantageously, said pipe gripping surface is covered with a material which is corrosion-resistant, for example titanium.

The present invention also provides an adaptor provided with a plurality of inserts in accordance with the invention.

If desired, each insert may have teeth of a specific hardness, with the hardness of the teeth of one insert differing from the hardness of the teeth of another insert.

There is also provided slips provided with one or more adaptors in accordance with the present invention.

The present invention also provides an elevator incorporating an insert in accordance with the present invention.

For a better understanding of the present invention and to show how the same may be carried into effect, reference will now be made, by way of example, to the accompanying drawings, in which:

DETAILED DESCRIPTION OF THE PREFERRED EMBODIMENT

Figure 1:
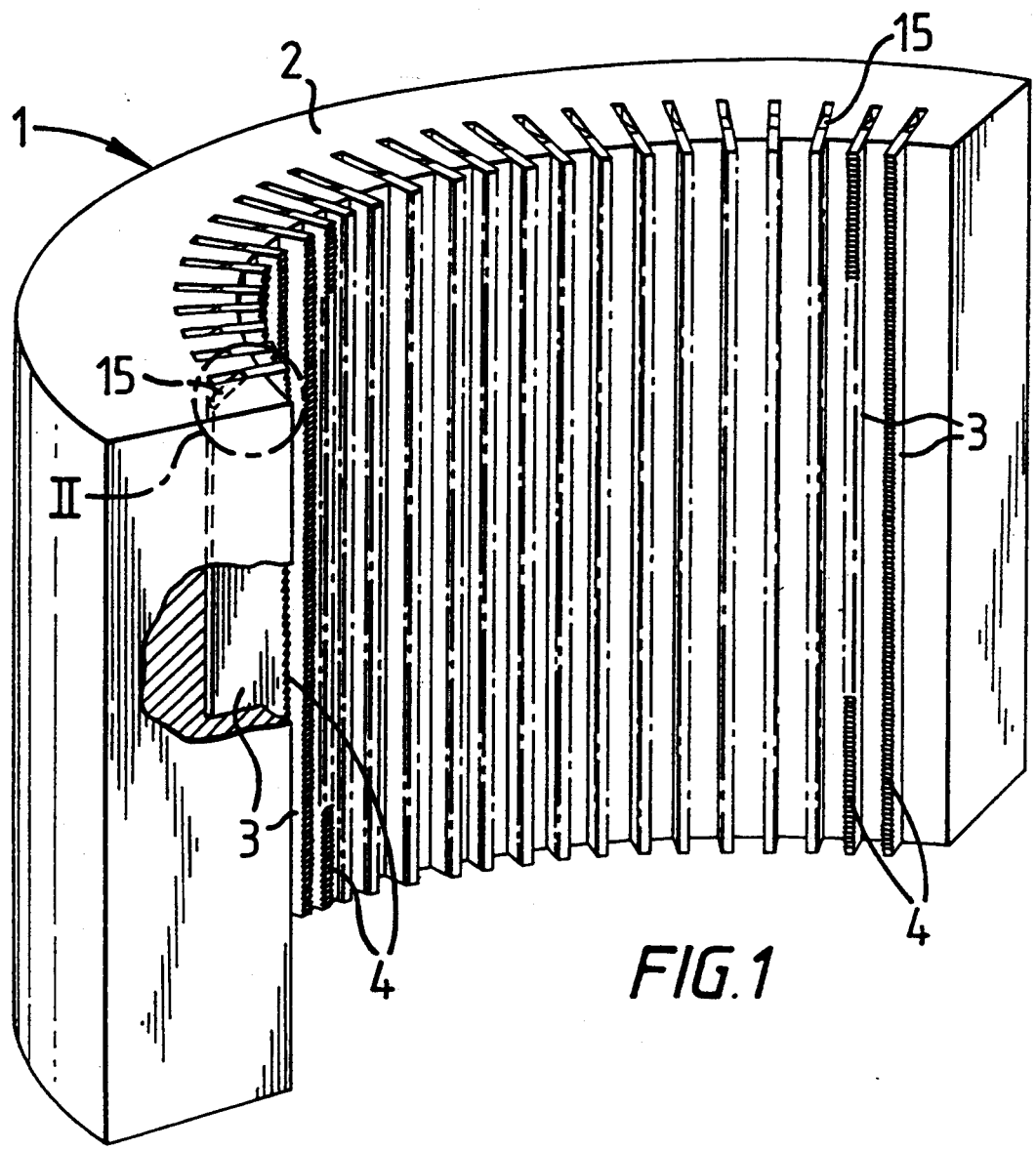
FIG. 1 is a perspective view, with part cut away, of an insert in accordance with the invention.

Referring to FIG. 1 of the drawings, there is shown an insert which is generally identified by reference numeral 1. The insert 1 comprises a resilient member 2 which is provided with a multiplicity of strips 3, each of which is provided with a plurality of teeth 4.

The resilient base member 2 is made from rubber and the strips 3 are vulcanized in position as shown.

Figure 2:
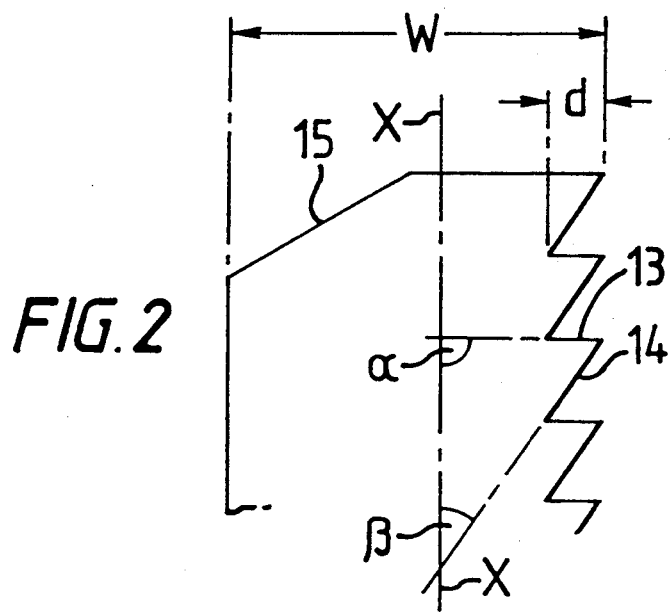
FIG. 2 is an enlarged view of the strip encircled and identified by reference numeral II in FIG. 1.

The teeth 4 have the shape shown in FIG. 2.

In particular, the teeth have a leading face 13 which is inclined at an angle α of 90° to the vertical X—X and a trailing face 14 which is inclined at an angle β of 35° to the vertical X—X. The strip 3 typically has a width W of 9 mm and a length of 60 mm. The teeth have a depth d of 1 mm. In addition, the top rear surface of the strip 3 is provided with a chamfer 15 which enables the strips 3 to be correctly orientated during fabrication of the insert. The strips 3 are coated with titanium to inhibit corrosion and improve wear properties.

Figure 3:
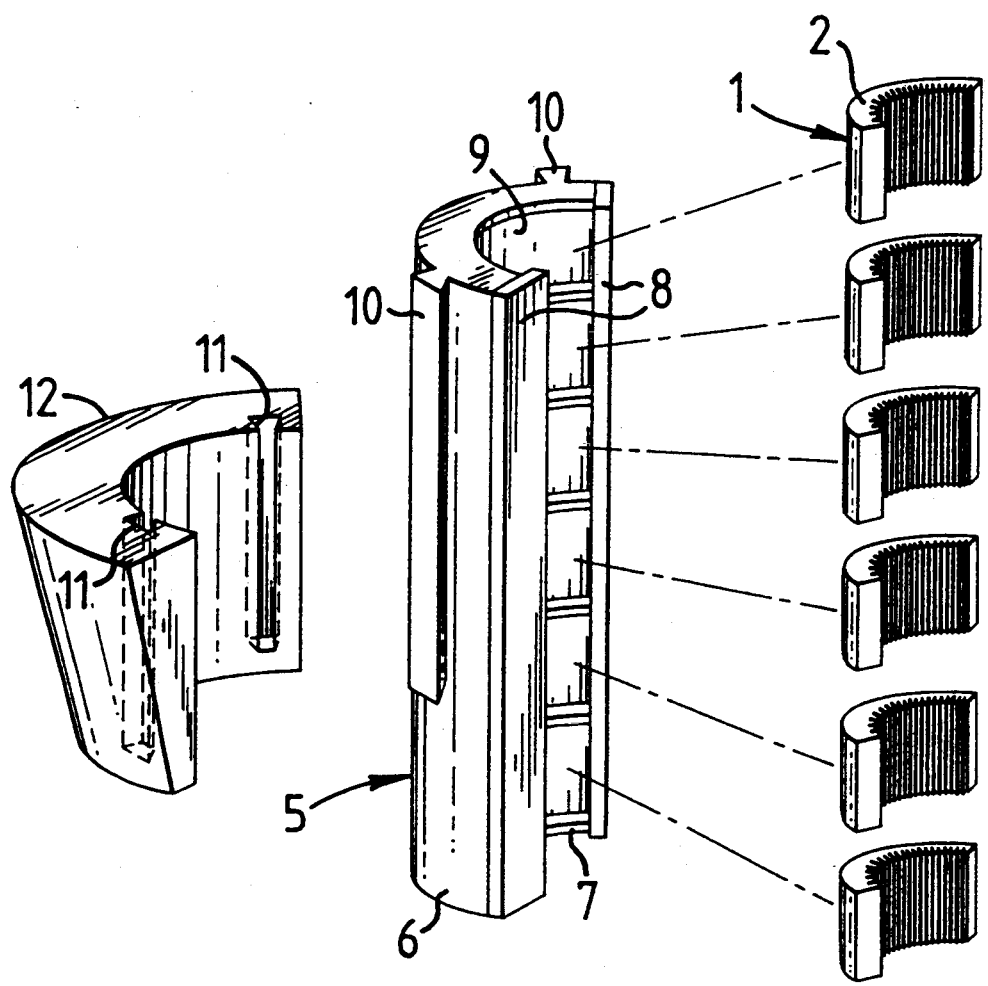
FIG. 3 is an exploded perspective view of part of a slip using inserts in accordance with the invention.

Referring now to FIG. 3, there is shown an adaptor 5 which comprises an arcuate outer member 6 provided with a plurality of ribs 7 bounded by members 8. The arcuate outer member 6, ribs 7 and members 8 define six separate cavities 9. The construction of the adaptor 5 increases overall rigidity and resists twisting.

The adaptor 5 is provided with tongues 10 which slidably engage in dove-tail grooves 11 in a wedge 12.

In use, a plurality of adaptors 5, typically three, are arranged in a circle in an apparatus (generally referred to as "slips") for holding a casing string. When it is desired to hold a casing in the slips, wedges 12 are lowered into a tapered base member (not shown). This applies the teeth to the side of the casing. As the casing is lowered, the teeth grip the casing and urge the wedges 12 downwardly further gripping the casing.

The use of multiple inserts 1 supported by respective ribs 7 reduces the overall compression in the longitudinal plane of the inserts 1 compared with an embodiment in which a single insert spans the entire depth of the adaptor 5.

Various modifications to the embodiment described are envisaged; for example, the teeth 3 of an insert could be of different hardnesses, for example, relatively hard (and brittle) teeth at the top of the insert and softer (and less brittle) teeth at the bottom of the insert. Harder teeth are better for gripping the pipe; however, if the hard teeth are snapped off, the softer teeth will still grip the pipe, albeit at the cost of some surface damage. If desired, the teeth of the inserts in an adaptor may have differing hardness with, for example, the hardness of the teeth in the uppermost insert being greater than the hardness in the lowermost insert. In a more radical departure, the teeth 4 could be formed by covering the strips 3 with a coating of abrasive material, for example carborundum or diamond dust. However, the teeth shown in FIG. 2 are preferred since they help apply the slips when the casing is lowered and are comparatively easy to release when the casing is raised prior to releasing the slips.

While primarily intended for use in slips, inserts in accordance with the present invention may also be incorporated in elevators for moving individual pipes and short pipe strings.

Figure 4:
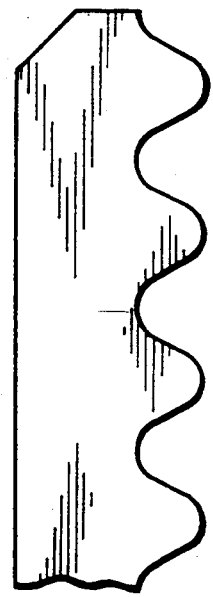
FIG. 4 is a side view of an alternative strip.
Figure 5:
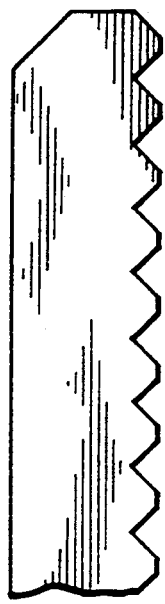
FIG. 5 is a side view of a further alternative strip.

The strips used in inserts for elevators (or light duty slips) may have less pointed teeth, for example as shown in FIG. 4 or FIG. 5. Thus, in FIG. 4, the tips of the teeth are quite rounded while in FIG. 5 the tip of each tooth is provided with a flat having a length of, for example 0.25 mm.

What is claimed is:

1. An insert for use in slips, which insert comprises a resilient base member which supports a plurality of spaced apart strips each having a pipe gripping edge and wherein each of said strips projects beyond said resilient base member to form channels between adjacent strips for accommodating debris from the surface of the casing to be gripped.

2. An insert as claimed in claim 1, wherein said pipe gripping edge is provided with a multiplicity of teeth.

3. An insert as claimed in claim 2, wherein said teeth have a leading face which is inclined at an angle ($\alpha$) of from 60° to 120° to the longitudinal axis of the strip on which they are formed.

4. An insert as claimed in claim 3, wherein $\alpha$ is substantially 90°.

5. An insert as claimed in claim 2, wherein said teeth have a trailing face which is inclined at an angle ($\beta$) of from 20° to 50° to the longitudinal axis of the strip on which they are formed.

6. An insert as claimed in claim 5, wherein $\beta$ is substantially 35°.

7. An insert as claimed in claim 2, wherein said teeth have a depth (d) of from 0.2 mm to 2 mm.

8. An insert as claimed in claim 7, wherein d is substantially 1 mm.

9. An insert as claimed in claim 2, wherein said teeth are of differing hardness.

10. An insert as claimed in claim 1, wherein said strips, in use, extend substantially parallel with the casing to be gripped.

11. An insert as claimed in claim 1, wherein said pipe gripping edge is covered with a material which is corrosion-resistant.

12. An insert as claimed in claim 11, wherein said material comprises titanium.

13. An insert for use in slips, which insert comprises a resilient base member which supports a plurality of spaced apart strips each having a pipe gripping edge, wherein said strips, in use, extend substantially parallel with the casing to be gripped, wherein each of said strips projects beyond said resilient base member to form channels between adjacent strips for accommodating debris from the surface of said casing, and wherein said pipe gripping edge is provided with a multiplicity of teeth.

14. An insert as claimed in claim 13, wherein said teeth have a leading face which is inclined at an angle ($\alpha$) of from 60° to 120° to the longitudinal axis of the strip on which they are formed.

15. An insert as claimed in claim 14, wherein $\alpha$ is substantially 90°.

16. An insert as claimed in claim 15, wherein said teeth have a trailing face which is inclined at an angle ($\beta$) of from 20° to 50° to the longitudinal axis of the strip on which they are formed.

17. An insert as claimed in claim 15, wherein $\beta$ is substantially 35°.

18. An insert as claimed in claim 13, wherein said teeth have a depth d of from 0.2 mm to 2 mm.

19. An insert as claimed in claim 18, wherein d is substantially 1 mm.

20. An insert as claimed in claim 13, wherein said teeth are of differing hardness.

21. An insert as claimed in claim 13, wherein said pipe gripping edge is covered with a material which is corrosion-resistant.

22. An insert as claimed in claim 21, wherein said material comprises titanium.

23. An adaptor provided with a plurality of inserts, each of which inserts comprises a resilient base member which supports a plurality of spaced apart strips each having a pipe gripping edge and wherein each of said strips projects beyond said resilient base member to form channels between adjacent strips for accommodating debris from the surface of the casing to be gripped.

24. An adaptor as claimed in claim 23, wherein said pipe gripping edge is provided with a multiplicity of teeth.

25. An adaptor as claimed in claim 24, wherein said teeth have a leading face which is inclined at an angle ($\alpha$) of from 60° to 120° to the longitudinal axis of the strip on which they are formed.

26. An adaptor as claimed in claim 25, wherein $\alpha$ is substantially 90°.

27. An adaptor as claimed in claim 24, wherein said teeth have a trailing face which is inclined at an angle ($\beta$) of from 20° to 50° to the longitudinal axis of the strip on which they are formed.

28. An adaptor as claimed in claim 27, wherein $\beta$ is substantially 35°.

29. An adaptor as claimed in claim 24, wherein said teeth have a depth d of from 0.2 mm to 2 mm.

30. An adaptor as claimed in claim 29, wherein d is substantially 1 mm.

31. An adaptor as claimed in claim 24, wherein said teeth are of differing hardness.

32. An adaptor as claimed in claim 23, wherein said strips, in use, extend substantially parallel with the casing to be gripped.

33. An adaptor as claimed in claim 23, wherein said pipe gripping surface is covered with a material which is corrosion-resistant.

34. An adaptor as claimed in claim 33, wherein said material comprises titanium.

* * * * *